United States Patent
Kalavakuru et al.

(10) Patent No.: US 11,678,205 B2
(45) Date of Patent: Jun. 13, 2023

(54) ADAPTIVE BEAMWIDTH SWITCHING AND BEAM STEERING IN LARGE PUBLIC VENUE (LPV) SMART ANTENNA SYSTEM

(71) Applicant: Cisco Technology, Inc., San Jose, CA (US)

(72) Inventors: Sivadeep Reddy Kalavakuru, Akron, OH (US); Ardalan Alizadeh, Milpitas, CA (US); John Martin Blosco, Norton, OH (US); Matthew Aaron Silverman, Shaker Heights, OH (US); Gautam D. Bhanage, Milpitas, CA (US); John Matthew Swartz, Lithia, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/833,811

(22) Filed: Jun. 6, 2022

(65) Prior Publication Data
US 2022/0303790 A1    Sep. 22, 2022

Related U.S. Application Data

(63) Continuation of application No. 17/145,242, filed on Jan. 8, 2021, now Pat. No. 11,368,857.

(51) Int. Cl.
*H04W 16/28* (2009.01)
*H04B 17/391* (2015.01)
(Continued)

(52) U.S. Cl.
CPC .......... *H04W 16/28* (2013.01); *H04B 17/391* (2015.01); *H04W 24/02* (2013.01); *H04W 64/006* (2013.01); *H04W 84/12* (2013.01)

(58) Field of Classification Search
CPC ... H04W 16/28; H04W 24/02; H04W 64/006; H04W 84/12; H04B 17/391; H04B 7/0695; H04B 7/088; H04B 7/0617
See application file for complete search history.

(56) References Cited

U.S. PATENT DOCUMENTS

| 11,368,857 | B1 * | 6/2022 | Kalavakuru | H04B 7/0617 |
| 2003/0147353 | A1 * | 8/2003 | Clarkson | H04W 24/00 370/252 |

(Continued)

FOREIGN PATENT DOCUMENTS

WO    2019210982 A1    11/2019

OTHER PUBLICATIONS

Centralized Self-Optimization in LTE-A Using Active Antenna Systems by Eric Moulines (Year: 2013).*

(Continued)

*Primary Examiner* — Siu M Lee (74) *Attorney, Agent, or Firm* — Merchant & Gould P.C.

(57) ABSTRACT

Optimal determination of wireless antenna configurations may be provided. A computing device may direct an antenna array of an Access Point (AP) to generate a wide beamwidth, to locate a cluster of two or more stations. Upon locating the cluster, the AP can narrow the beamwidth, and, with the narrower beamwidth, receive a key performance indicator (KPI) from at least one of the two or more stations in the cluster. The computing device may then generate a statistical (Continued)

model, based on the KPI and an antenna vector of the antenna array. Based on the statistical model, the computing device can determine a second antenna vector to optimize the KPI for one or more of the client stations. The computing device can then modify the antenna state of the AP to generate the determined antenna vector.

20 Claims, 6 Drawing Sheets

(51) Int. Cl.
*H04W 24/02* (2009.01)
*H04W 64/00* (2009.01)
*H04W 84/12* (2009.01)

(56) References Cited

U.S. PATENT DOCUMENTS

| | | | |
|---|---|---|---|
| 2005/0101352 A1* | 5/2005 | Logothetis | H01Q 25/002 455/562.1 |
| 2015/0319707 A1 | 11/2015 | Abdelmonem et al. | |
| 2017/0265104 A1 | 9/2017 | Arslan et al. | |
| 2019/0230516 A1 | 7/2019 | DeMarco et al. | |
| 2020/0322814 A1 | 10/2020 | Tofighbakhsh et al. | |

OTHER PUBLICATIONS

Fakoukakis, F.E., et al., "High-density wireless networks for auditoriums validated reference design"; Progress in Electromagnetics Research Symposium 2005, Hangzhou, China, Aug. 22-26, 2005.

Singh, A.B., et al., "On performance improvement of wireless push systems via smart antennas"; Intl. Journal of Advanced Engineering Research and Science (IJAERS), 1(4), Sep. 2014, pp. 1-16.

Huong, T.H., "Beamforming Phased Array Antenna toward Indoor Positioning Applications, Advanced Radio Frequency Antennas for Modern Communication and Medical Systems"; Albert Sabban, IntechOpen, DOI: 10.5772/intechopen.93133. Available from: https://www.intechopen.com/books/advanced-radio-frequency-antennas-for-modern-communication-and-medical-systems/beamforming-phased-array-antenna-toward-indoor-positioning-applications.

Notification of Transmittal of the International Search Report and the Written Opinion issued in International Patent Application No. PCT/US2022/011127, dated May 9, 2022, (14 pages).

* cited by examiner

ADAPTIVE BEAMWIDTH SWITCHING AND BEAM STEERING IN LARGE PUBLIC VENUE (LPV) SMART ANTENNA SYSTEM

RELATED APPLICATION

This application is a continuation of co-pending U.S. patent application Ser. No. 17/145,242, filed Jan. 8, 2021, the disclosure of which is incorporated herein by reference, in its entirety.

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller.

In Large Public Venues (LPVs), for example, stadiums, concert halls, convention centers, etc., antennas are usually deployed at a few fixed locations, e.g., near catwalks, scoreboards, etc. These antennas often cannot be adjusted. For example, the antenna beam cannot be changed based on the density of clients while servicing those clients. In at least some LPVs, there is need for different Radio Frequency (RF) coverage areas depending on event. In at least some high-density environments with massive crowds associated with LPVs, optimizing network coverage or network throughput, based on changes in the distribution of clients, is a tedious task. Therefore, in these scenarios, where the density of clients changes during the event (e.g., a game or concert), a fixed antenna pattern does not provide the optimal usage of LPV antenna(s).

BRIEF DESCRIPTION OF THE FIGURES

The accompanying drawings, which are incorporated in and constitute a part of this disclosure, illustrate various example of the present disclosure. In the drawings.

DETAILED DESCRIPTION

Overview

Optimal determination of wireless antenna configurations may be provided. A computing device may direct a wide beamwidth, from an antenna array of an Access Point (AP), to locate a cluster of two or more stations. Upon locating the cluster, the AP can narrow the beamwidth, and, with the narrower beamwidth, receive a Key Performance Indicator (KPI) from at least one of the two or more stations in the cluster. The computing device may then generate a statistical model, based on the KPI and an antenna vector of the antenna array. Based on the statistical model, the computing device can determine a second antenna vector to optimize the KPI for one or more of the client stations. The computing device can then modify the antenna state of the AP to generate the second antenna vector.

Both the foregoing overview and the following example are examples and explanatory only, and should not be considered to restrict the disclosure's scope, as described and claimed. Furthermore, features and/or variations may be provided in addition to those described. For example, example of the disclosure may be directed to various feature combinations and sub-combinations described in the example.

EXAMPLE

The following detailed description refers to the accompanying drawings. Wherever possible, the same reference numbers are used in the drawings and the following description to refer to the same or similar elements. While example(s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wi-Fi may be used as an access technology for indoor environments. In public venues hosting events having large crowds (e.g., stadiums, convention centers, etc.), user and AP density may be high. Due to the limited number and width of Wi-Fi channels, high user density may result in degradation of performance of individual client device(s). Aspects herein provide a process to adaptively switch the LPV antenna pattern based on the changes in client density. The proposed method may consist of four steps, explained hereinafter In a first step of the automatic configuration of the AP antenna, the AP or other computing system can measure the clients' parameters for optimizing the network. This step may occur only one time at the beginning of an event or after initial network setup. After this initial measurement(s), the AP or other computing system may gather parameters over time while the optimization, described below, is happening.

For this initial gathering of client parameters, the AP may switch the antenna to a wide beamwidth (e.g., at BW-3 dB; 70×20 degrees) to find client station locations with locate services of the APs. When a higher density cluster of client stations is identified, the AP can then switch to a narrow beamwidth (e.g., at BW-3 dB; 25×25 degrees). The AP may then steer the antenna beam in primary positions (e.g., −10°, 0°, 10°, etc.) offset in the horizontal plane to point the narrow beam at the cluster. The AP may then transition to the second step.

An optimization problem is considered in the second step based on some or all of the parameters gathered during the first step and this step. These parameters can include one or more of, but is not limited to: client density (for example, based on a number of client(s)/radio(s) connected to the AP), which the AP can use to determine loading and maybe optimize a number of clients assigned to each radio; Received Signal Strength Indicator (RSSI); nearest clients based on max function from combination of RSSI-serving radio and auxiliary-radio combination; Angle-Of-Arrival (AOA) and/or a fast locate result to locate higher density clusters of clients; an adaptive cell size that may be based on client cluster(s) and/or channel reuse through lower side lobes of the antenna; and/or throughput-per-radio, which can determine a load on the radio.

Changing antenna parameters to optimize one or more of the above or other KPIs data is the third step. The optimization approach relies on statistical learning based on the KPIs. Using the KPI data, statistical learning based optimization finds the functional relationship between the KPI(s) and the network parameters, e.g., the antenna configuration. This statistical model is then used for the optimization interpolation which, in turn, provides an optimized data point for updating or refining the statistical model. Thus, the model building and/or refinement and optimization phases can follow each other recursively.

The optimization problem can be an optimization of a vector of antenna parameters, e.g., beamwidth, azimuth, and elevation, which is related to an objective function that is associated with a KPI or other client parameter which is to be maximized, for example, throughput. The antenna vector may also be governed by one or more constraints, which may include the measured parameter described above, e.g., RSSI and/or client density. Then, the optimization function can predict or estimate a best antenna vector.

A surrogate-based optimization function, as explained above, can help generate the statistical model of the function and constraints. The optimization can have two phases. First, an interpolation method, e.g., Kriging interpolation, can be applied to construct a surrogate model from the noisy network data. Second, a fast converging search and poll method can optimize the antenna vectors over the model, in a recursive framework. Interpolation tries to predict an unknown function for the antenna vector containing the input variables and where the output is variable. The search mechanism provides a global optimal solution for the interpolation method, and the model is generated based on observed data.

Once the statistical model of KPIs is generated and is then updated over time, the AP or other computing device can solve the above optimization problem to find the best antenna vector. To simplify the process of solving this optimization problem, it may be possible to only consider discrete states for the antenna.

The optimization problem above can be solved "per AP" or by a "centralized" computing system. In some implementations, the limited number of antenna states can be selected to guarantee that the selected antenna beamwidth does not degrade the performance of the entire network with respect to Radio Resource Management (RRM). In at least another implementation, the optimization problem can be solved by a centralized computing system, e.g., a wireless controller, to concurrently adjust the antennas of two or more APs in a LPV. This centralized method will provide more measurement data to better model the KPIs.

The beam of the LPV Antenna System can be steered horizontally and vertically. The gain of the antenna may be changed. Further, side lobe reuse can be modified. Thus, various parameters of the antennal function may be changed and evaluated by the methods and systems herein. The changes to antenna performance can be evaluated for channel reuse, based on client density, in certain sectors of a LPV, e.g., an arena. Then, the output of the optimization problem can be determined from one of the defined states of the antenna.

Based on the objective function of the proposed optimization problem, the improvement of the network can vary. For instance, the optimization of the antenna parameters can provide a more optimal allocation of clients that are associated at a predetermined data rate requirement (e.g., higher or lower data rates) to a radio(s)/cell(s). For example, clients that are connected at higher data rates/spatial stream, e.g., clients using 802.11ax may be served better than clients using lower data rates/spatial streams, e.g., clients using 802.11ac/11n. In some implementations, the system and methods can serve Very Important Persons (VIP) clients, for example, clients in a front row or with court side seats, with better Quality of Service (QoS) and/or packet capture analysis.

In a fourth step, antenna configurations are unchanged and only parameters of the clients are collected. When a change happens in the environment, e.g. an end or start of an event, and the change effects the density of clients significantly, the system can identify the change by evaluating network performance, e.g., KPIs, against thresholds. Once the thresholds are crossed, the method may return to the second step to determine a next best antenna vector.

Figure 1:
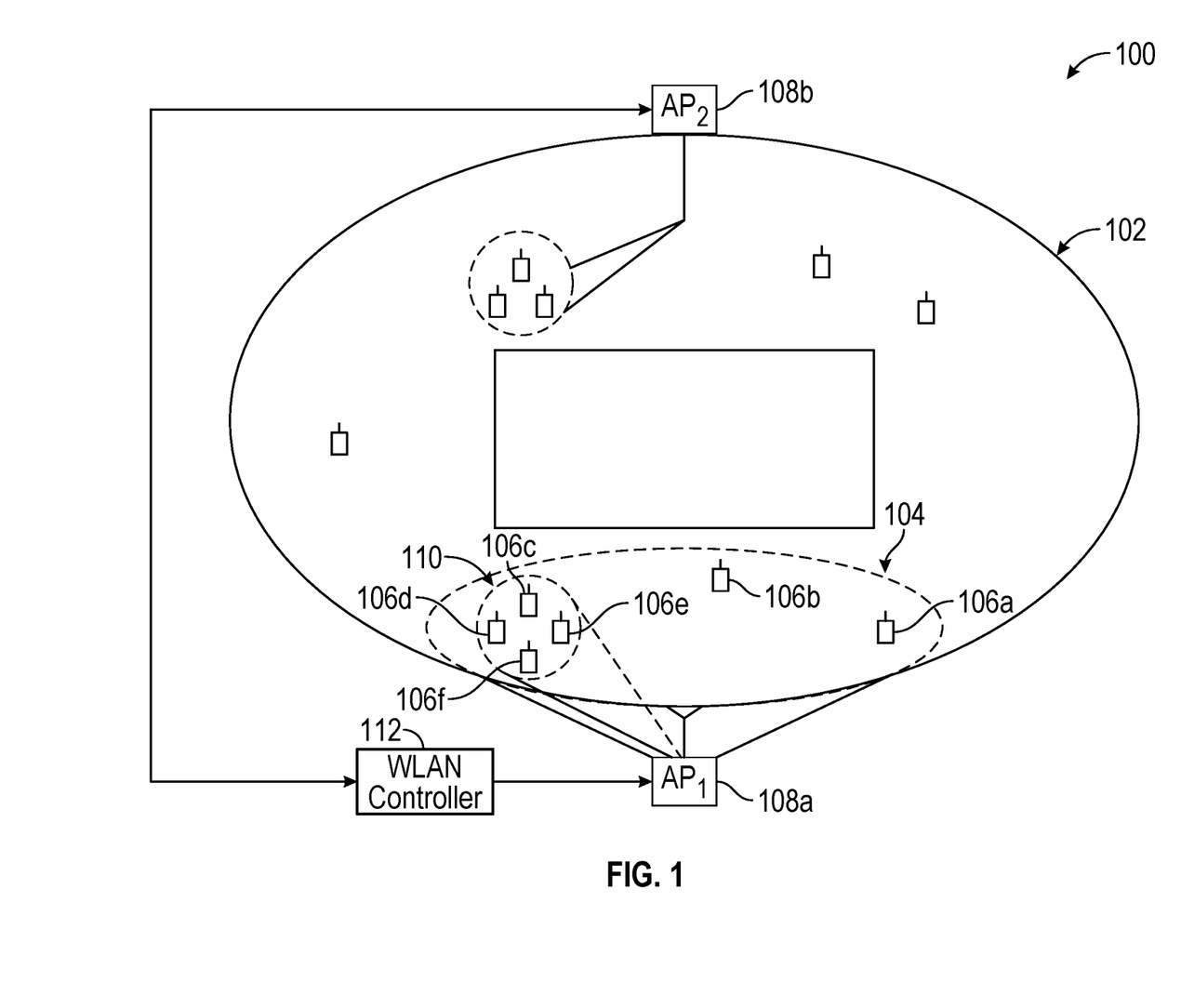
FIG. 1 is a block diagram of wireless network environment in accordance with aspects of the present disclosure.

A wireless environment 100 may be as shown us in FIG. 1, which may also be referred to as a wireless network 100. The wireless environment 100 may include a Large Public Venue (LPV) 102. The LPV 102 can be an arena, a conference center, a stage, a stadium, etc. The LPV 102 may include one or more APs 108a and 108b. An AP 108 may include a computing system as described in conjunction with FIG. 5. At least one of the APs 108 may have an antenna array that may be electronically or otherwise controlled (e.g., without manual adjustment by a person), as described hereinafter in conjunction with FIGS. 2A and 2B. The antennal array(s) of the AP(s) 108 can change parameters, values, and/or characteristics of the operation of the antenna array to modify the antenna's vector and/or other operations. For example, the antenna vector can include the antenna beamwidth, the antenna beam's direction, the antenna's beam azimuth, etc. The beamwidth may be a wide beamwidth, e.g., a 70° beamwidth, as represented by dotted line representing the wide beamwidth 104, which may be produced by AP 108a. The wide beamwidth 104 can cover more physical area of the LPV 102. In this way, the AP 108a may search for one or more client devices 106a through 106e (which are also referred to as clients 106, client Stations (STAs) 106 or simply as STAs 106) to determine if a cluster 110 of client stations 106 exist.

The stations 106 may be scattered within the area of the LPV 102. The wide beamwidth 104 can identify a cluster(s) 110 of two or more stations, for example, the cluster 110 including client stations 106c through 106f. The clusters 110 may have a higher density of stations 106 in one physical area or within physical proximity of each other, for example, within twenty feet of each other. The AP 108a can change the antenna vector to better serve the cluster 110 of client stations 106c-106f. Thus, the AP(s) 108 can change the beamwidth, the azimuth, the beam elevation, etc. to provide better service to those APs 108 in the cluster 110.

FIG. 1 also represents a wireless environment 100, also referred to as the wireless network 100. As shown in FIG. 1, the wireless network 100 may comprise an LPV 102 in which a client device 106 may roam. The LPV 102 may have a corresponding plurality of wireless APs 108 that may establish a WLAN to provide client device(s) 106 network connectivity. The wireless network 100 may be provided in a public venue (e.g., stadiums, convention centers, etc.). While several client devices 106 are shown in FIG. 1, more or fewer client devices 106 may be used in conjunction with wireless network 100.

Site specific policies may be provisioned on a WLAN Controller (WLC) 112 for the plurality of APs 108 to join wireless network 100 and to allow WLC 112 to control the wireless network 100. Consistent with examples of the disclosure, an AP 108 or the WLC 112 may configure the antenna array of one or more APs 108 to a determined antenna vector/parameters to serve a client device cluster(s) 110.

As stated above and shown in FIG. 1, wireless network 100 may comprise Wi-Fi APs (i.e., first AP 108a and/or second AP 108b) that may be configured to support a wireless (e.g., Wi-Fi) hotspot. The Wi-Fi hotspot may comprise a physical location where a user, operating client device 106, may obtain access to wireless network 100 (e.g., Internet access), using Wi-Fi technology, via a WLAN using a router connected to a service provider. The wireless hotspot may comprise a physical location where a user, operating client device 106, may obtain access to wireless network 100 (e.g., Internet access), using a wireless technology, via a WLAN using a router connected to a service provider.

In other example of the disclosure, rather than APs 108, devices may be used that may be connected to a cellular network that may communicate directly and wirelessly with end use devices (e.g., client device 106) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, example of the disclosure may use wireless communication protocols using, for example, Wi-Fi technologies, cellular networks, or any other type of wireless communications.

Client device 106 may comprise, but is not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

The elements described above of wireless network 100 (e.g., WLC 112, first AP 108a, second AP 108b, etc.) may be practiced in hardware, in software (including firmware, resident software, micro-code, etc.), in a combination of hardware and software, or in any other circuits or systems. The elements of wireless network 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of wireless network 100 may be practiced in a computing device 500, also referred to as a computing system 500.

Figure 2A:
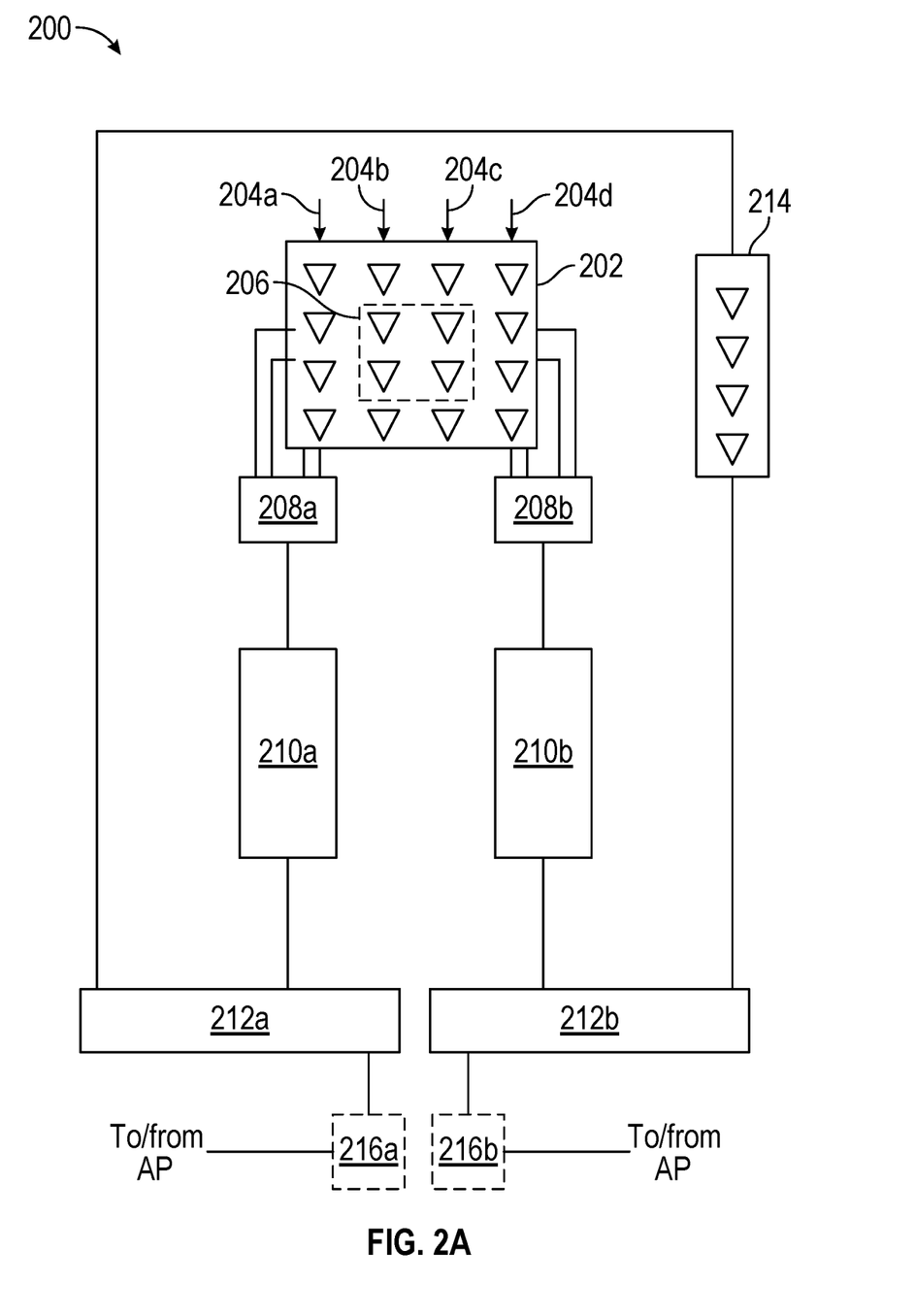
FIG. 2A is a block diagram of an Access Point (AP) antenna array in accordance with aspects of the present disclosure.
Figure 2B:
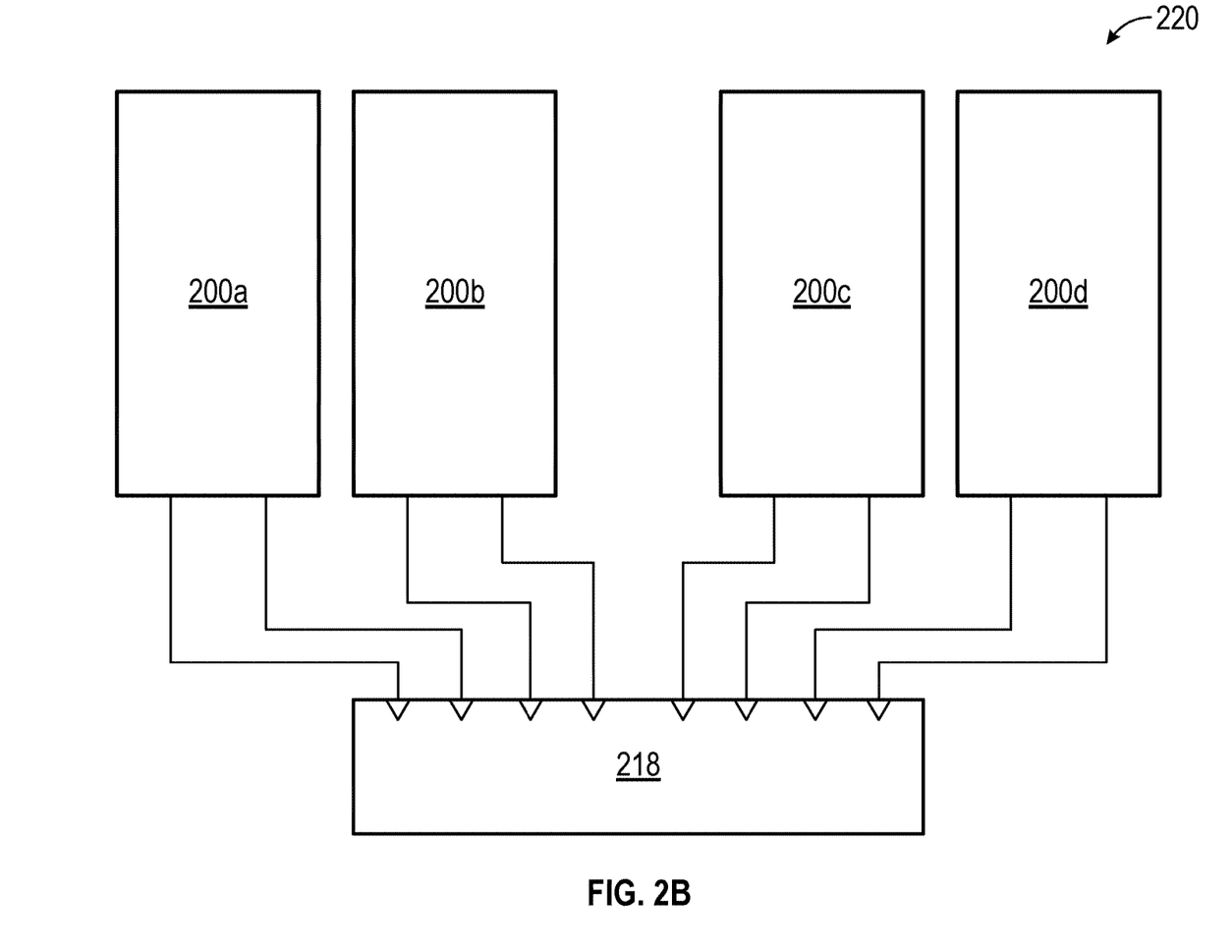
FIG. 2B is another block diagram of an Access Point (AP) antenna array in accordance with aspects of the present disclosure.

An example AP 108, with an antenna array, may be as shown in FIGS. 2A and 2B. The AP 108 can include a processing component and a radio component. The radio component 200 can have one or more antennas 204a-204d. Each AP 108 may include more than one radio component(s) 202a through 216b.

FIG. 2A illustrates an example implementation of a component layout for an example antenna segment 200, according to example(s) of the present disclosure. Each antenna segment 200 is configured to operate a narrow-beam antenna array 202 and/or a wide-beam antenna array 214 (at a given time). The narrow-beam antenna array 202 provides an N×N array of antenna elements, whereas the wide-beam antenna array 214 provides a 1×M array of antenna elements. It should be noted that, in some configurations, wide-beam antenna array 214 may be a part of the elements forming the narrow-beam antenna array 202. The number of elements (e.g., the individual signaling elements making up the antenna array(s) in an array determines the beamwidth in azimuth and elevation. The layout of the narrow-beam patch 202 can, in some implementations, provide an (N−2)×(N−2) subset of inner antenna elements 206, which are surrounded by a subset of outer antenna elements (i.e., those antenna elements included in the narrow-beam antenna array 202 that are not neighbored by at least four antennas).

The narrow-beam antenna array 202 and the wide-beam antenna array 214 can be dual polarized antenna arrays. By being dual polarized, two different radio paths can use the same array at the same time. One path is connected to a vertical polarization feed, while the other is connected to a horizontal polarization feed, essentially providing two antenna arrays with one set of elements.

Signals are routed to/from the narrow-beam antenna array 202 or the wide-beam antenna array 214 via a switching pathway. The switching pathway includes several switches 210a-b and 212a-b that route signals to/from the activated antenna array. Base switches 212a-b determine whether the signals are routed to/from the narrow-beam array 202 or the wide-beam antenna array 214, whereas intermediary switches 210a-b route the signals to/from the phase shifters 208a-b connected to the narrow-beam antenna array 202. Although illustrated with one arrangement of switching components, it will be appreciated that various other arrangements of switching components (including cascaded 2:1 switches) can be used to link the antenna arrays to various signaling sources.

The low side lobes formed through aggressively tapering the narrow beam prevent APs 108 in the same frequencies from detecting one another's transmissions, even when mounted in close proximity to one another (e.g., within 50 feet). In some implementations, the side lobes have an amplitude of −30 dB relative to the main lobes of the narrow beam. In various examples, unequal power dividers and attenuators are used to provide lower powered signals to the outer antenna elements of the narrow-beam antenna array 202 than the inner antenna elements, thereby reducing the power of the side lobes relative to a main lobe. Due to the control of the side lobe amplitude, the antenna segment 200 (and any antenna array including the antenna segment 200) can omit band-pass filters 216a-b that are typically used to increase isolation between co-located radios within an AP 108, although in some examples, the band-pass filters can be retained to increase co-located radio isolation.

A pair of phase shifters 208a-b is connected to each feed of the dual-polarized narrow-beam antenna array 202, which allows for each polarization of the beam to be steered. These positions can include a neutral position, where no steering is applied, a positive offset from the neutral position in a first direction, and a negative offset from the neutral position in a second direction opposite to the first direction. In various implementations, the phase shifters 208a-b are Butler matrices, but other switched phase feed networks can be used as phase shifters 208a-b to steer the beams in discrete increments while maintaining minimal side lobes. The first phase shifter 208a steers the first beam for the vertical polarization by phase shifting the first signal across columns of the narrow-beam antenna array 202, and wherein the second phase shifter 208b steers the first beam for the horizontal polarization by phase shifting the second signal across columns of the narrow-beam antenna array 202.

In various examples, the phase shifters 208a-b steer the narrow beam by creating relative phase differences in the columns of the narrow-beam array 202. For example, when steering to a positive offset, if the first column 204a has a phase of A, the second column 204b would have a phase of A+B where B is a fixed phase difference determined to create the desired degrees of steering. The third column 204c would have a phase of A+(2*B), and the fourth column 204d would have a phase of A+(3*B). To steer to a negative offset, if the first column 204a has a phase of A, the second column 204b would have a phase of A−B where B a fixed phase difference determined to create the desired degrees of steering. The third column 204c would have a phase of A−(2*B), and the fourth column 204d would have a phase of A−(3*B). To remain at the neutral or zero-offset position, the phases across the columns 204a-d are all equal.

The wide-beam antenna array 214 produces a fixed position beam (e.g., the wide beamwidth 104 discussed in FIG. 1), whereas the narrow-beam antenna array 202 produces an electronically steerable beam (e.g., the beam to focus on the cluster 110a-b discussed in FIG. 1). The narrow-beam antenna array 202 produces a beam of a first beamwidth, which is less than the beamwidth of the beam produced by the widebeam antenna array 214. In various examples, the beamwidth of the beam produced by the wide-beam antenna array 214 includes or encompasses all of the coverage ranges of the beam produced by the narrow-beam antenna array 202 steered to any of the potential positions thereof.

FIG. 2B illustrates a component layout for an antenna array 220, according to examples of the present disclosure. The antenna array 220 includes four instances of an antenna segment 200a-d, as described in relation to FIG. 2A, and an interface 218 acting as a signal source for signals to transmit via the antenna segments 200a-d, and may be used as a steerable and switchable antenna array for various APs 108 in LPVs 102. In various examples, two or more radios are connected to the antenna segments 200a-d (and/or alternative antennas) via the interface 218.

In various examples, additional alternative antennas can also be connected (via one or more switches) to various ports of the interface 218 to allow for different frequencies, communication standards, or beam patterns to be used in the antenna array 220. For example, the antenna segments 200a-d can operate in a first frequency bandwidth (e.g., 5 GHz) from all of the radios sending signals via the ports of the interface 218 (e.g., ports ABCD and EFGH), but additional antennas (not illustrated) connected to a subset of the ports (e.g., ports EGHG) can operate in a second frequency bandwidth (e.g., 2.4 GHz).

Using four instances of the antenna array 220, an AP 108 is configured to operate in a dual 4×4 Multiple Input Multiple Output (MIMO) mode with no mutual interference between radios. Accordingly, due to the beam shaping and tapering provided by the individual antenna segments 200a-d (e.g., precise antenna pattern with low side lobe levels), the antenna array 220 allows for high-channel reuse in high-density applications where several APs 108 are deployed with corresponding instances of the antenna array 220. Switchable beam directions allow flexibility in aligning cells in the same or adjoining coverage areas for the different APs 108 so that several APs 108 can be grouped closely together (e.g., within 50 feet of one another).

Figure 3A:
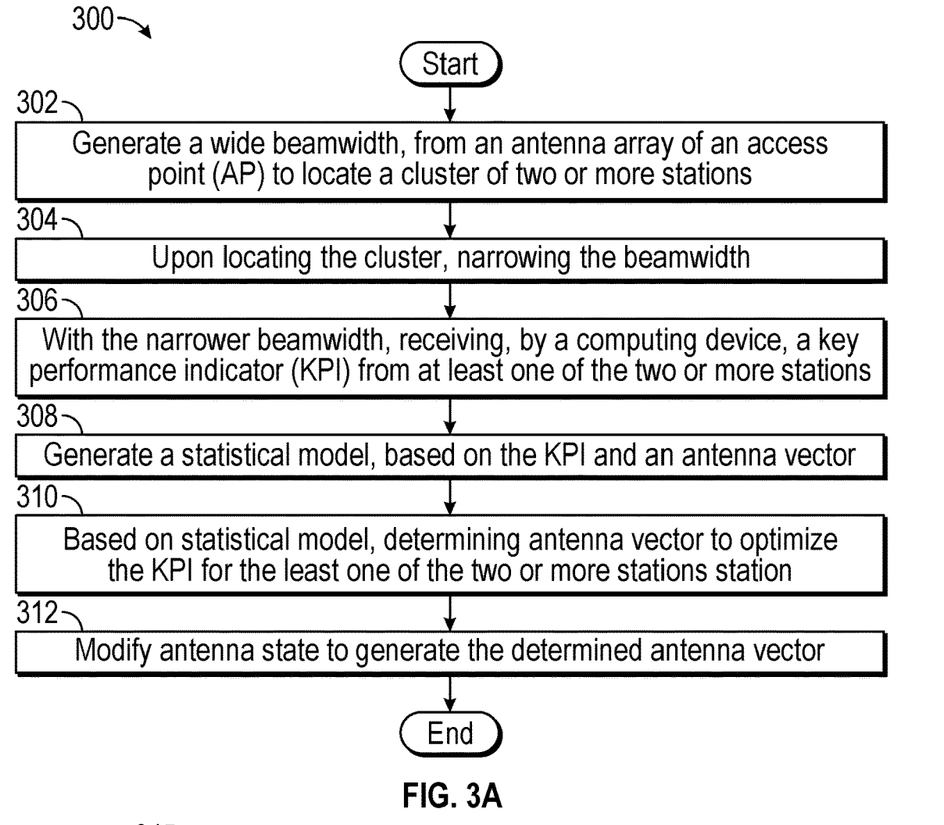
FIG. 3A is a flow chart of a method for changing antenna parameters to optimize antenna performance in accordance with aspects of the present disclosure.

FIG. 3A is a flow chart setting forth the general stages involved in a method 300 consistent with aspects of the disclosure for providing automatic antenna beamwidth switching and antenna beam steering in a LPV smart antenna system. Method 300 may be implemented using computing device 500 (e.g., AP 108 or WLC 112) as described in more detail below with respect to FIG. 5. Ways to implement the stages of method 300 will be described in greater detail below.

Method 300 may begin at starting block and proceed to stage 302, where computing device 500 may directly or indirectly operate the smart antenna system 220 to generate a wide beamwidth 104. For example, LPV 102 can include a wireless network 100 that may provide wireless (e.g., Wi-Fi) coverage with the APs, e.g., APs 108a-b, installed across the LPV 102.

Computing device 500 instructs the antenna array 220 to generate a wide beamwidth, for example, wide beamwidth 104 in the LPV 102. The computing device 500 can be associated with an AP 108, WLC 112, etc. The computing device 500 can determine or locate a cluster 110 of client devices or stations 106, including two or more stations 106 in the area covered by the wide beamwidth 104, in stage 304. This cluster 110 can be, for example, the high density of client devices 106c through 106f in a smaller area, which are may be predetermined, as shown in FIG. 1. These clients 106 may be within physical proximity of each other. For example, the stations 106 may all be within the range of a narrow beamwidth, which may determine the cluster area 110a. In other implementations, the stations 106c through 106f may be within 20 feet, 50 feet, etc. The stations 106, in a high density cluster, may be in communication with the AP 108a or AP 108b, which may be in communication with and/or controlled by the WLC 112.

Upon locating the cluster 110 of client devices or stations 106c through 106f, the computing device 500 may instruct the antenna array 220 to narrow the beamwidth, for example, to cover an area represented by dashed line 110, in stage 304. As narrow beamwidth may be directed at the cluster 110 of client stations 106c-106f. In some implementations, there may be more than one cluster 110 of clients 106 and the antenna array 220 may direct more than one narrow beamwidth at the different clusters 110 of clients 106. Further, in at least some implementations, the narrow beamwidth may only be used for high density clusters of clients 106.

The density of the cluster 110 may be indicated by the number of client devices 106 within the physical footprint or coverage area of the narrow beamwidth. For example, the cluster 110 may be considered high density if there are 10 or more client stations 106 within the extents of the narrow beamwidth, if there are more than 50 client stations 106 within the extents of the narrow beamwidth, if there are more than 100 client stations 106 within the extents of the narrow beamwidth, etc. The AP 108 may also steer the narrow beam to the location of the cluster 110. For example, the antenna array 220 may produce the narrow beamwidth, but may produce it in an area of the wide beamwidth 104 that may not be pointed at the cluster 110 of clients 106c through 106f. The antenna array 220, in these situations, may then steer that narrow beamwidth to the cover the cluster 110 of clients 106.

With the narrow beamwidth, the computing device 500 may then begin to receive Key Performance Indicators (KPIs) from at least one of the two or more stations 106c-106f present in the cluster 110, in stage 306. The KPIs may be received, from the antenna array 220, and then by the computing device 500 associated with the AP 108a or the WLC 112. The KPIs may be received from uplink signals from the one or more client stations 106 or from data or information provided by the stations 106. In other implementations, the client stations 106c through 106f may report KPIs as understood by those client stations 106 from downlink signals from the AP 108. The KPIs can include one or more of, but are not limited to, the client density based on a number of client devices 106 connected to the AP 108 (for example, to determine AP loading and to optimize the number of clients 106 per radio on the AP 108); the Receive Signal Strength Indicator (RSSI) from the signals transmitted from the client station 106 to the receiving radio at the AP 108; a nearest client station indicator (for example, as determined by a function measuring signal arrival times from the combination of the RSSI-serving radio and auxiliary radio of the AP 108); an Angle-of-Arrival (AoA) or station location information to locate the high density cluster 110 of clients 106; a cell size (which may be based on the client concentration of the cluster 110 in the channel reuse through lower side lobes of the antenna); throughput-per-radio either downlink or uplink; etc.

It may be possible in some implementations, to have the antenna array 220 to narrow the beamwidth to get a more focused pattern on the cluster 110. The throughput per radio can be used by the computing device 500 to determine loading of the number clients 106 per radio at the AP 108. Other KPIs can be determined or received at the AP 108 or WLC 112. These KPIs may form a statistical model 400 which can be generated based on the KPIs and the associated antenna vector, in stage 308.

Figure 4A:
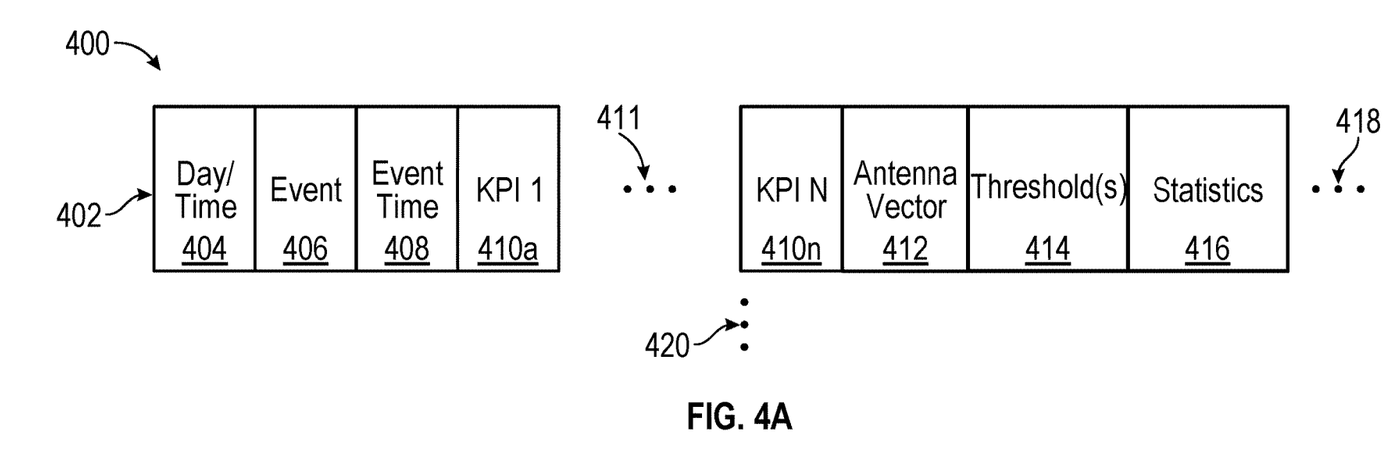
FIG. 4A is a block diagram of a data structure in accordance with aspects of the present disclosure.

An implementation of the statistical model 400 may be as shown in FIG. 4A. The statistical model 400 may include one or more data structure(s) 402. The data structure 402 can include an association of one or more KPIs 410a through 410n with an antenna vector 412. These associations can record changes in KPIs that may be measured at the AP 108 based on the type of antenna vector 412 used during servicing of client devices 106.

The antenna vector 412 can include a set of parameters. For example, the parameters in the antenna vector 412 can include one or more of, but is not limited to, the type of beamwidth used by the antenna array 220, the azimuth direction of the beamwidth, and the elevation or the vertical positioning of the beam. These different measures may form antenna vector 412.

The computing device 500 can generate the statistical model 400 over time, through a plurality of iterations, by recording changes in KPIs 410, when new antenna vectors 412 are used. Further information may be included in the statistical model 400 as is described in conjunction with FIG. 4A below. Thus, using statistical learning at the computing device 500, the computing device 500 can create a functional relationship or model between the KPIs 410 and the network parameters, for example, the antenna configuration.

The model may be then used in an optimization algorithm to determine the optimal antenna configuration for the cluster 110 or other clusters based on factors of the environment. The model may be built over recursive changes to the antenna configuration, and recording the concomitant changes in KPI(s) 410. By using this model, in stage 308, the computing device can determine antenna vector(s) 412 to optimize the KPIs 410 for at least one of the two more stations 106c-106f in the cluster 110.

In stage 310, the computing system 500 can solve an optimization problem to determine an antenna vector 412 that is better suited to maximize or improve some of the one or more of the measured parameters collected in stage 308. For example, the optimization problem can be written as:

$$s = \text{maximum } f(s) \text{ subject to } C_i(s)$$

In the above equation, "s" is the vector or antenna parameters that may include at least the beamwidth, azimuth, and/or elevation of the antenna. The function of the equation, "f(s)", can be one of the KPIs 410, for example, throughput to one or more of the APs 108 or through the AP 108 to one or more of the client stations 106. The constraints, "C(i)", can include the one or more other KPIs 410, including our RSSI, client density, or other types of constraints required or evaluated by the AP 108. The optimization problem can be solved as an algorithm estimated from the statistical model 400. The solution process may consist of two phases.

The first phase may include an interpolation of the algorithm to construct a surrogate statistical model 400 from the noisy network data. For example, the statistical model 400 associates KPIs 410 with various antenna vectors and can be used to interpolate or determine new data points that are likely based on the previously-recorded antenna parameters. In an implementation, the interpolation can be a Kriging interpolation. Kriging interpolation is an estimation or construction of new data points from the discrete set of known data points in the statistical model 400. Kriging is a method of interpolation on a Gaussian process and covered by covariance. Kriging can give a linear, unbiased prediction of intermediate values, where the estimation places an interpolation or estimation between covariance of the data. Kriging can provide a better approximation than other types of interpolating methods. Upon interpolating or determining an estimation of a better or best antenna parameter, the method may move to stage 312.

In stage 312, the computing device 500 may control the AP 108 to change or modify the antenna state to generate the determined antenna vector estimated from the interpolation. Thus, the antenna array 220 may change one or more of the beamwidth, elevation, and/or azimuth to improve the function of the wireless service provided by the AP 108 and/or optimize or improve the one or more other KPIs 410. Upon obtaining or determining the new determined antenna vector, the AP 108 may begin to receive new or changed KPIs 410 from the one or more client stations 106. These new KPIs 410 may then be used to update the statistical model 400 and the determination of a next antenna vector may proceed in an iterative process. Thus, the modification of the antenna vector can generate a new or updated statistical model 400 that can then be evaluated to estimate a new azimuth, elevation, beamwidth, etc. for the antenna that may better optimize the function, f(s), and, possibly, the other constraints and/or KPIs 410.

The optimization problem described above can be solved per AP 108 or can be solved by the WLC 112 for two or more APs 108. The WLC 112 can optimize antenna vectors 412 for two or more APs 108a, 108b and/or across and the LPV 102 or over a portion of the LPV 102. Thus, a WLC 212 can determine or create a statistical model 400 for the two or more APs 108 within the wireless environment 100. From the statistical model 400, the WLC 212 can determine antenna states for two or more APs 108 to optimize KPIs 410 in one or more client stations 106 and to determine which APs 108 should service the various client clusters 110. Thus, the statistical model 400 created by the WLC 112 may also indicate which AP 108 was servicing the cluster 110.

In some implementations, the number of antenna states available to be changed or used in the optimization problem may be limited. For example, there may only be four different types of antenna states, as provided in data structure 422 of FIG. 4B. These limited antenna states allow for quicker resolution of the optimization problem and for reducing the size of the statistical model 400.

Figure 4B:
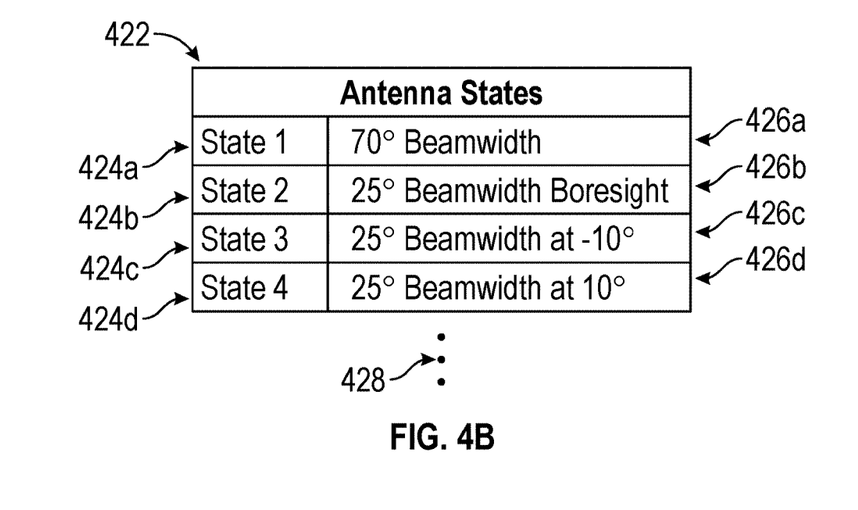
FIG. 4B is another block diagram of a data structure in accordance with aspects of the present disclosure.

For example, the limited or predetermined number of antenna states or vectors may have a first state 424a, a second state 424b, a third state 424c, and/or a fourth state 424d. The first state 424a may include a large beamwidth, e.g., a 70° beamwidth 426a, which provides the beamwidth 104 as is shown in FIG. 1. The second state 424b can include a 25° boresight beamwidth 426b, which can change the beamwidth to that as shown with dashed line 110 in FIG. 1. The third state 424c can include a change in elevation from 0° to −10° 426c. A fourth state 424d may include a change in beam elevation to positive 10° from an elevation of 0° 426d.

Another part of the antenna state can include the azimuth of the beam, which may be provided within the entire 360° range of the AP 108 and, in some implementations may be not part of the limited antenna states shown in data structure 422. It is possible that the limited antenna states may have more or fewer than four antenna states as shown in FIG. 4B, as is represented by ellipses 428. The four antenna states may be used to limit the time to determine or resolve the optimization problem and limit or reduce the amount of data that may be provided in the antenna vectors 412, and thus, the data associated therewith in the data structure of the statistical model 400.

If the computing system 500 is to determine optimization on a per AP 108 basis. The solutions may be selected to guarantee that the beamwidth will not degrade the performance of other APs 108 of the wireless network 100, with respect to Radio Resource Management (RRM). As such, the AP 108 may report the determined antenna parameters to the WLC 112, which may provide feedback as to whether that antenna state is acceptable within the wireless network 100. In other implementations, the AP 108 may determine, based on instructions or other information, sent from the WLC 112, if the optimized or determined antenna state may be acceptable within the wireless network 100.

Other types of antenna parameters that may be provided in the antenna states include one or more of, but is not limited to, the azimuth to which the antenna was steered, which may be plus or minus 10°, 20°, 40°, etc. Further, the antenna state may include the gain, the configuration of load, and the configuration of sidelobes for channel reuse, client density, or other types of antenna configurations. Thus, the output of the optimization problem, provided in stage 310 may be one of the defined states in data structure 422.

The statistical data 400 may be as shown in FIG. 4A, which can include more or fewer fields than that shown in FIG. 4A, as represented by ellipses 418. Further, there may be more or fewer different data structures or data elements 402 representing different data produced by different antenna vectors 412 at different times than those shown in FIG. 4A, as is represented by ellipses 420. There may be one or more KPIs 410 associated with each antenna vector 412, and thus, there may be more KPIs 410 than those shown in data element 402, as is represented by the ellipses 411 between the KPIs 410a and 410n. In some implementations, each AP 108 may store the statistical data 400; in other implementations, the statistical data 400 may be stored at a common location, e.g., the WLC, a cloud storage location, etc.

The data element 402 can include one or more portions, for example, a day and/or time field 404, an event field 406, an event time field 408, one or more KPIs 410a through 410n, the antenna vector 412, one or more thresholds 414, and/or one or more statistics 416. The day/time field 404 can provide a date and/or time for when the measurements, statistics, and/or KPIs 410 are recorded. The event field 406 can record the type of event that was being held in the LPV 102, for example, a football game, a basketball game, a firework show, etc. The type of event 406 may allow for better optimization of future estimation problems which are based on similar events. The event time 408 can include, for example, a start time, a stop time, and/or another time of the event having the event type stored in the field 408. Thus, instead of simply a day/time measurement, as provided in field 404, the event time 408 can be based off a start time of event and provides how many minutes, hours, etc., into the event this measurement of KPIs 410 was recorded. For example, the event time 408 can be one hour and 15 minutes from the beginning of the event.

Data elements 402 can record one or more KPIs 410a through 410n. The KPIs 410 may be as explained previously and can include one or more of, but is not limited to, client density, the RSSI, AoA, results of locate functions, the cell size, the throughput, or other types of measurements or determinations. Each of these measurements, calculations, and/or determinations may be recorded in one or more of the KPI fields 410a through 410n.

The antenna vector 412 can include one or more of, but is not limited to, the beamwidth, the beam azimuth, the beam elevation measurements for the antenna state at the time when the KPIs 410 are recorded. The antenna vector 412 can be one of the limited states, as provided in data structure 422. In other implementations, antenna vector 412 can include an unlimited number of states based on or constrained only by the number of combinations of beamwidth, azimuth, elevation, or other factors associated with the antenna.

The thresholds data 414 can include one or more thresholds that, when crossed, can indicate a change in the wireless environment 100 is occurring and a new antenna vector or parameter may be needed to continue to optimize the function. For example, if the optimization problem is solved based on throughput of one or more of the client devices 106 or APs 108, the threshold 414 may be based on an amount of throughput. Once the amount of throughput crosses the threshold 414, a new estimation or optimization may be completed. For example, if the throughput threshold is one Gbyte of data per minute, then dropping below the threshold triggers a new optimization solution.

One or more statistics 416 can include other statistics that may not be part of the KPIs 410. The statistics 416 can include one or more of, but is not limited to, attendance at the event, the number of empty seats at the event, the seating arrangement of the event, the types of devices used during the event, or other such information. The statistics 416 may allow for even better or more useful optimizations that are not simply based on KPIs 410 but can include other information.

Figure 3B:
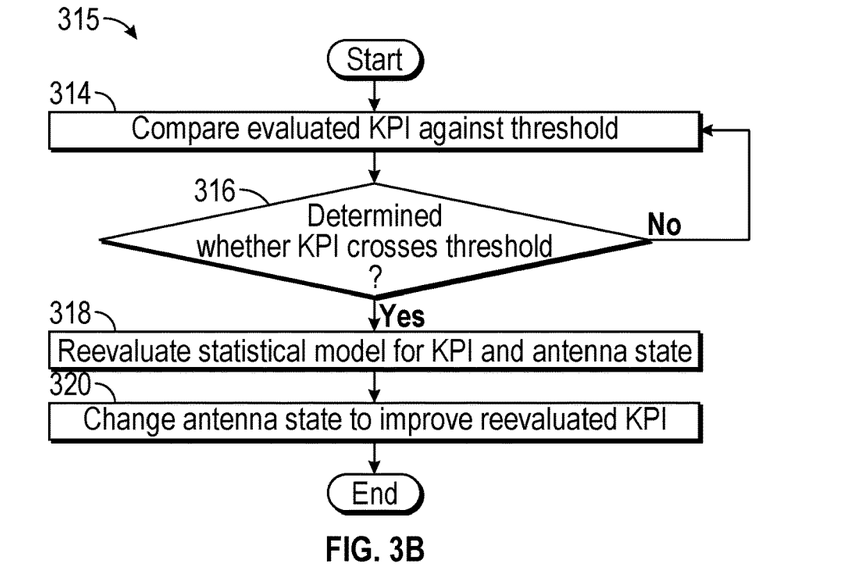
FIG. 3B is a flow chart of another method for changing antenna parameters to optimize antenna performance in accordance with aspects of the present disclosure.

Another method 315 for determining antenna configuration changes may be as shown in FIG. 3B. In the method of FIG. 3B, in stage 314, the computing system 500 can compare the KPIs 410 or other data currently being received at an AP 108 to one or more thresholds 414. If the KPIs 410 or other information has not crossed a threshold 414, the antenna configuration or vector may stay unchanged. If the KPIs 410 of the clients 106 do change and one or more KPIs 410 cross a threshold 414, in stage 316, the method, of FIG. 3B, may proceed "YES" to stage 318. However, if no KPI 410 or only some portion KPIs 410 have crossed the threshold 414, then the method may proceed "NO" back to stage 314.

In stage 318, the computing system 500 can again reevaluate the statistical model 400 for the KPIs 410 associated with the antenna state threshold 414. In stage 318, the evaluation of the optimization problem may be the same or similar to that optimization solved in stage 310 for one or more the clients 106 within the LPV 102. The optimization problem may again change the antenna vector for one or more of the APs 108. In some implementations, the change in antenna vector 412 may be determined not to improve the KPI 410, and the new antenna vector is not deployed.

However, when the new antenna state does improve the KPIs 410 or function ƒ(s), the computing system 500 can instruct the antenna array 220 of the AP 108 to change the antenna state to improve the reevaluated KPI(s) 410. Thus, in stage 320, the AP 108 can change to a different antenna state, such as antenna state 426*d*. This change in antenna state can then be reevaluated or re-determined if the KPIs 410 are improved and the KPIs 410 are currently within the threshold or limits provided by thresholds 414. In this way, there may be constant updating of the antenna state. This improvement of or constant evaluation of the antenna state and the KPIs 410 ensures that when conditions change, in the LPV 102, APs 108 can adjust to ensure the best service to the client stations 106.

Figure 5:
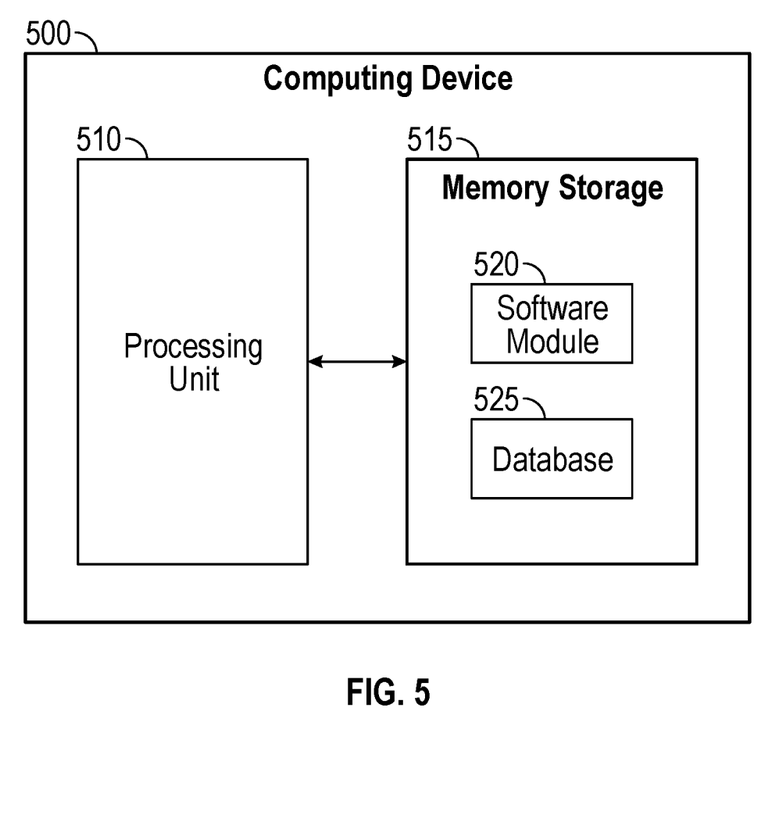
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing load balancing for saturated wireless as described above with respect to FIG. 2. Computing device 500, for example, may provide an operating environment for WLAN Controller 112, first AP 108*a*, second AP 108*b*, devices 106*a*-106*f*, AP antenna segment 200, or AP antenna array 220. WLAN Controller 112, first AP 108*a*, second AP 108*b*, devices 106*a*-106*f* AP antenna segment 200, or AP antenna array 220 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

The methods and systems here have distinct advantages and allow for different types of improved services for client stations 106. For example, there may be optimal allocation of beamwidth and service to certain clients 106 that may be associated with particular data rates. For example, clients 106 that have paid for requested higher data rates or spatial streams may receive better service. Further, devices that use higher data rates or different spatial streams, for example, client devices 106 using Wi-Fi 802.11ax versus 802.11ac or 802.11an may receive better service as provided by such improved wireless standard. For the VIP clients 106 that may be seated in the front row of the LPV and requested better Quality Of Service (QOS), the system can provide better beamwidth and beam steering to improve KPIs 410 and ensure better packet capture. Thus, the APs, within the LPV, can service different clients 106 differently and provide optimized service for some clients 106 based on need, client density, or the ability of the client devices 106.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain example of the disclosure have been described, other example may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device 500 on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
   receiving, by a computing device, a Key Performance Indicator (KPI) from at least one of two or more stations;
   generating a statistical model, based on the KPI and an antenna vector of an antenna array;
   determining that the KPI crossed a threshold;
   reevaluating, in response to determining that the KPI crossed the threshold, the statistical model, wherein reevaluating the statistical model comprises, based on the statistical model, determining a second antenna vector to optimize the KPI for the at least one of the two or more stations; and
   changing antenna state to generate the second antenna vector to improve reevaluated KPI.

2. The method of claim 1, wherein the second antenna vector includes one or more of a beamwidth, an azimuth, and/or an elevation.

3. The method of claim 1, wherein determining the second antenna vector comprises solving an optimization problem associated with an optimization function.

4. The method of claim 3, wherein solving the optimization problem associated with the optimization function comprising interpolating the second antenna vector based on the statistical model.

5. The method of claim 4, wherein interpolating the second antenna vector comprises Kriging interpolation.

6. The method of claim 1, wherein the second antenna vector is limited to a predetermined number of antenna vectors.

7. The method of claim 6, wherein the predetermined number of antenna vectors comprises four antenna vectors, and wherein the four antenna vectors are a 70° beamwidth, 25° boresight beamwidth, a 25° beamwidth at −10° elevation, and a 25° beamwidth at +10° elevation.

8. A system comprising:
   a memory; and
   a processing unit coupled to the memory, wherein the processing unit is operative to:
   receive a Key Performance Indicator (KPI) from at least one of two or more stations;
   generate a statistical model, based on the KPI and an antenna vector of an antenna array;
   determine that the KPI crossed a threshold;
   reevaluate, in response to determining that the KPI crossed the threshold, the statistical model, wherein reevaluating the statistical model comprises, based on the statistical model, determining a second antenna vector to optimize the KPI for the at least one of the two or more stations; and
   change antenna state to generate the second antenna vector to improve reevaluated KPI.

9. The system of claim 8, wherein the second antenna vector includes one or more of a beamwidth, an azimuth, and/or an elevation.

10. The system of claim 8, wherein the processing unit being operative to determine the second antenna vector comprises the processing unit being operative to solve an optimization problem associated with an optimization function.

11. The system of claim 10, wherein the processing unit being operative to solve the optimization problem associated with the optimization function comprises the processing unit being operative to interpolate the second antenna vector based on the statistical model.

12. The system of claim 11, wherein the processing unit being operative to interpolate the second antenna vector comprises the processing unit being operative to use Kriging interpolation.

13. The system of claim 11, wherein the second antenna vector is limited to a predetermined number of antenna vectors.

14. A non-transitory computer-readable medium that stores a set of instructions which when executed perform a method executed by the set of instructions comprising:
  receiving, by a computing device, a Key Performance Indicator (KPI) from at least one of two or more stations;
  generating a statistical model, based on the KPI and an antenna vector of an antenna array;
  determining that the KPI crossed a threshold;
  reevaluating, in response to determining that the KPI crossed the threshold, the statistical model, wherein reevaluating the statistical model comprises, based on the statistical model, determining a second antenna vector to optimize the KPI for the at least one of the two or more stations; and
  change antenna state to generate the second antenna vector to improve reevaluated KPI.

15. The non-transitory computer-readable medium of claim 14, wherein the second antenna vector includes one or more of a beamwidth, an azimuth, and/or an elevation.

16. The non-transitory computer-readable medium of claim 14, wherein determining the second antenna vector comprises solving an optimization problem associated with an optimization function.

17. The non-transitory computer-readable medium of claim 16, wherein solving the optimization problem associated with the optimization function comprising interpolating the second antenna vector based on the statistical model.

18. The non-transitory computer-readable medium of claim 17, wherein interpolating the second antenna vector comprises Kriging interpolation.

19. The non-transitory computer-readable medium of claim 14, wherein the second antenna vector is limited to a predetermined number of antenna vectors.

20. The non-transitory computer-readable medium of claim 19, wherein the predetermined number of antenna vectors comprises four antenna vectors, and wherein the four antenna vectors are a 70° beamwidth, 25° boresight beamwidth, a 25° beamwidth at −10° elevation, and a 25° beamwidth at +10° elevation.

* * * * *